(12) United States Patent
Vilhuber et al.

(10) Patent No.: US 7,386,721 B1
(45) Date of Patent: Jun. 10, 2008

(54) METHOD AND APPARATUS FOR INTEGRATED PROVISIONING OF A NETWORK DEVICE WITH CONFIGURATION INFORMATION AND IDENTITY CERTIFICATION

(75) Inventors: Jan Vilhuber, Santa Cruz, CA (US); Max Pritikin, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 772 days.

(21) Appl. No.: 10/388,246

(22) Filed: Mar. 12, 2003

(51) Int. Cl.
*G06F 9/00* (2006.01)
*G06F 12/00* (2006.01)
*G06K 19/00* (2006.01)
*H04L 9/32* (2006.01)

(52) U.S. Cl. .................. 713/156; 713/153; 726/11; 726/18; 709/220

(58) Field of Classification Search ............... 713/156, 713/153; 726/11, 18
See application file for complete search history.

(56) References Cited

U.S. PATENT DOCUMENTS 6,816,897 B2 * 11/2004 McGuire .................... 709/223
6,856,602 B1 * 2/2005 Westberg .................... 370/254
6,877,093 B1 * 4/2005 Desai et al. ................. 713/156
6,973,569 B1 * 12/2005 Anderson et al. ........... 713/156
2002/0093915 A1 * 7/2002 Larson ....................... 709/203
2003/0084311 A1 * 5/2003 Merrien et al. ............. 713/191
2003/0088772 A1 * 5/2003 Gehrmann et al. .......... 713/175
2003/0225893 A1 * 12/2003 Roese et al. ................. 709/227
2004/0030923 A1 * 2/2004 Tindal et al. ................ 713/201

* cited by examiner

*Primary Examiner*—Gilberto Barron, Jr.
*Assistant Examiner*—A. Nobahar
(74) *Attorney, Agent, or Firm*—Hickman Palermo Truong & Becker

(57) ABSTRACT

According to one aspect, a provisioning server comprises a configuration module that configures a network device and an identification certification module that certifies the identity of the network device. With use of the provisioning server, the network device does not require configuration with network connectivity in order to obtain its certified identity. In one embodiment, configuration module configures the device for operation at the device's point of deployment in a network. In one embodiment, the identity certification module is configured to generate a digital certificate for the network device and the configuration module is configured to automatically configure the network device based on its digital certificate. The provisioning server is coupled to the network device with a secure communication link. As a result, a more trusted network device is ultimately deployed into its network of operation.

22 Claims, 4 Drawing Sheets

METHOD AND APPARATUS FOR INTEGRATED PROVISIONING OF A NETWORK DEVICE WITH CONFIGURATION INFORMATION AND IDENTITY CERTIFICATION

FIELD OF THE INVENTION

The present invention generally relates to communication networks. The invention relates more specifically to a method and apparatus for integrated provisioning of a network device with configuration information and identity certification.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network Device Configuration Management

FIG. 1 is a diagram that illustrates an existing environment for configuring and certifying the identity of a network device. A configuration server 102 is selectively communicatively coupled to one or more network devices 104. The network devices 104 are installed in or accessible through a provisioning environment 106, which provides a physical mounting location for the network devices, power supplies, and anything else needed for operation of the network device and for connectivity to network 108. A certificate authority 110 is communicatively coupled to network 108. Network 108 may be a public network or a closed network located in a manufacturing facility and established exclusively for the purpose of provisioning and configuring network devices 104 at such a facility before the devices are shipped to customers.

Network devices 104, such as routers, switches, gateways, or other devices, must be configured with certain parameters to be able to operate in a network. For example, a network device is typically configured at least with a specific IP address and subnet mask, identification of its applicable communication protocol, such as TCP/IP, and the port through which it will communicate with the network in which it will operate. Furthermore, in order for a network device to operate at a point of deployment within a network, the device needs to be configured in relation to its point of deployment. Configuration may involve loading a specific operating system software image, application programs, or other software elements, as well as setting various parameters and variables. Configuring a network device effectively defines the role or functionality of the device in a network.

The process of configuring a network device to operate in a network is often referred to as "provisioning" the device. A network device is not functionally operative until it is configured, thus, the device manufacturer typically performs some initial basic configuring of the device prior to delivery to a customer. The manufacturer connects a configuration server 102 to the network device 104 to perform basic configuration of the device. Furthermore, the device can be configured more extensively to operate at its point of deployment. Customer network administrators typically perform this more complex provisioning because they know the planned location of the device within their network and the functionality that is expected of the device.

Network Device Identity Certification

In some environments, for a network device to interoperate with other network devices in a secure manner, such that it is considered to be a trusted device, its identity must be verified or certified. When using certificates, a device's identity is certified with an associated digital certificate that is issued by a trusted certificate authority (CA), which requires the device to enroll with the CA. One existing protocol that facilitates secure enrollment of a network device with a CA is the Simple Certificate Enrollment Protocol (SCEP). A digital certificate electronically establishes a network device's credentials, for purposes of security and confidence in its identity when operating in a network. For example, network devices as IPsec clients may maintain an associated digital certificate so that IPsec-based communications and key exchanges are secure and trusted. A digital certificate typically includes the certificate holder's name, a serial number and expiration date associated with the certificate, and a copy of the holder's public key. Additionally, a certificate includes the digital signature of the CA, so that a recipient can verify that the certificate is authentic, using the CA's public key.

A certificate authority is an authority in a network that issues and manages security credentials and public keys. As an optional part of a public key infrastructure (PKI), a registration authority (RA) may verify user requests for digital certificates and indicate to the CA whether or not to issue a certificate.

With respect to a network device, in practice, the process of certifying the device's identity through acquisition of a digital certificate occurs after basic provisioning of the device, because the device requires network connectivity in order to communicate with a remote CA. In some approaches, the manufacturer performs the identity verification and certification process from a provisioning environment 106 with network connectivity. In this scenario, the network device 104 must be configured with connectivity to network 108, in order to communicate with the remote CA 110 to obtain a digital certificate. After the digital certificate is obtained, the administrator must configure the device for its actual point of network deployment. Such a process, which requires configuring the network device multiple times, is not trivial and can be complex and error prone.

In other approaches, the customer may perform the identity certification process after reception of the device and deployment in its network. However, certifying the identity of the device after it is deployed in a network involves manual verification of RSA key information, an error prone task humans are not well suited for. Hence, the security of the device is qualitatively diminished due to reduced confidence that the device's certification was properly and securely obtained. In some instances, the customer may forego certification of the device's identity altogether or use an alternative identity mechanism such as a global pre-shared key, thereby limiting the security of the network.

In the prior approaches, whether certifying a device's identity from a manufacturer's provisioning environment or from a customer's network deployment, the process of obtaining a digital certificate requires network connectivity to communicate with the CA. Communicating through a network has some inherent security risks arising from the possibility of an intruder hacking the certification process. Thus, the current process for obtaining a digital certificate from a CA mandates some "out of band" communication, as indicated by arrow 105 of FIG. 1. That is, the certification process requires the network administrator to contact the CA in a manner other than through the network, to exchange and/or verify information. For example, the administrator and CA may have to communicate via telephone, secured e-mail, etc. Such steps contribute to a cumbersome identity certification process, which, in some scenarios, results in the process not being performed and the device not being certified.

Based on the foregoing, there is a clear need for an improved mechanism for configuring a network device and for certifying the identity of the network device.

Further, there is a need for an approach that does not require temporarily configuring a device to have network connectivity, such as through a provisioning environment, to communicate with a remote certificate authority as part of a device identity verification and certification process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for integrated provisioning of a network device with configuration information and identity certification is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described according to the following outline:

1.0 Overview
2.0 Method and Apparatus for Integrated Provisioning of a Network Device
    2.1 Provisioning Server
    2.2 Process For Integrated Provisioning Of A Network Device
3.0 Implementation Mechanisms - Hardware Overview
4.0 Extensions and Alternatives 1.0 OVERVIEW According to one aspect, a provisioning server for integrated provisioning of a network device comprises a configuration module that configures a network device and an identification certification module that certifies the identity of the network device. With use of the provisioning server, the network device does not require configuration with network connectivity in order to certify its identity. In one embodiment, the network device is configured with the provisioning server for operation at the device's ultimate point of deployment, avoiding the need for multiple configurations.

In an embodiment, the identity certification module is configured to generate a digital certificate for the network device and the configuration module is configured to configure the network with its digital certificate. For example, the provisioning server includes a certificate authority to generate the digital certificate. Therefore, the conventional certification process, which includes communication with a certificate authority over a network, is avoided.

In an embodiment, a computer on which the server executes is physically co-located with and coupled to the network device with a secure communication link. For example, the computer is mechanically and electrically coupled to the network device with an electrical cable. Hence, with a direct link, security of communications between the server and the device is ensured. Furthermore, since network communication is not required between the server or network device and the certificate authority security and authenticity of the identity certification is ensured. As a result, a more trusted network device is ultimately deployed into its network of operation.

According to one aspect, a method for integrated provisioning of a network device includes configuring the network device at a provisioning location, for operation at a deployment location in a network. Furthermore, the identity of the device is also certified from the same provisioning location without requiring network connectivity.

Figure 2:
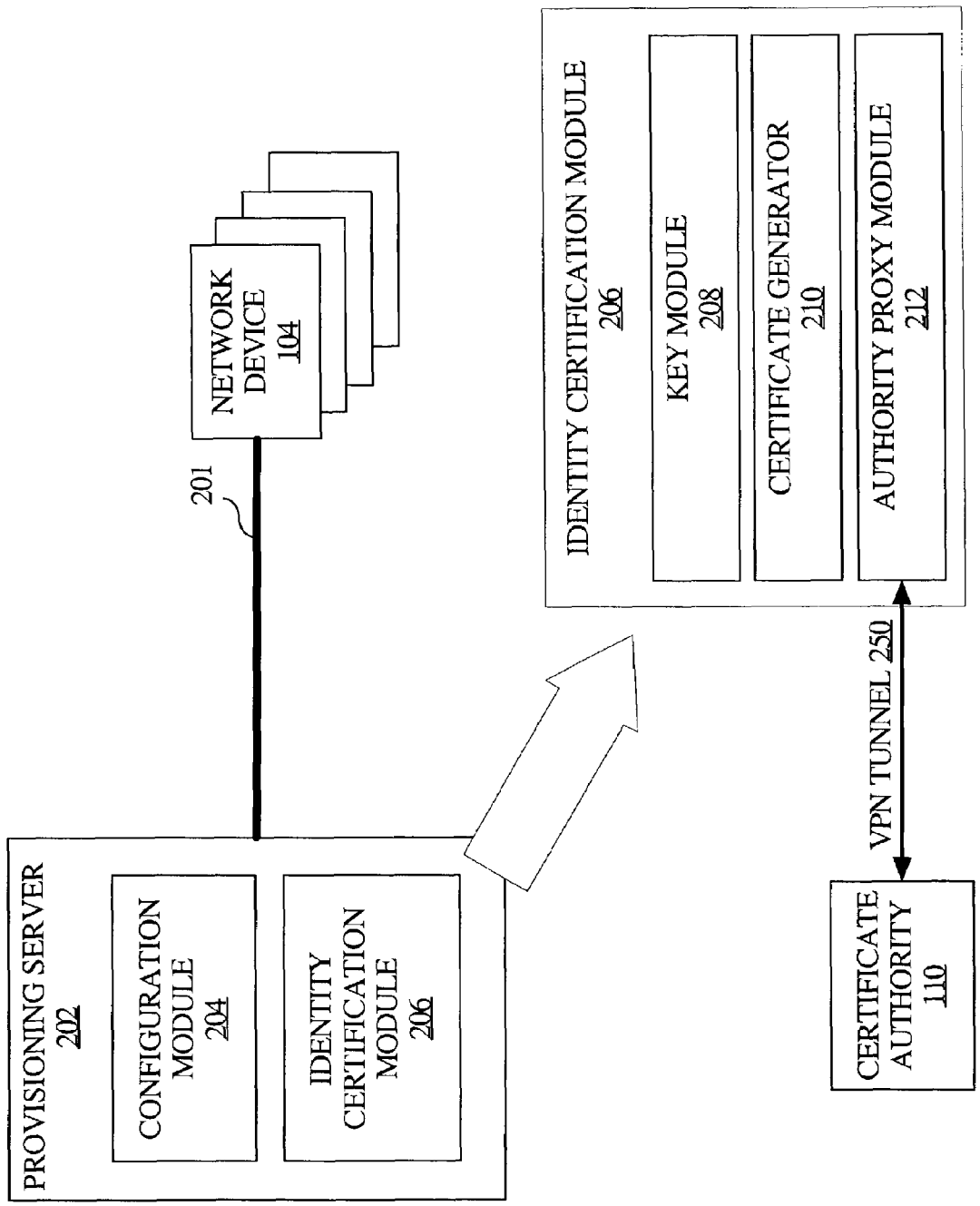
FIG. 2 is a diagram that illustrates an example of an operating environment in which an embodiment may be implemented.

2.0 METHOD AND APPARATUS FOR INTEGRATED PROVISIONING OF A NETWORK DEVICE 2.1 Provisioning Server FIG. 2 is a block diagram that illustrates an example of an operating environment in which an embodiment may be implemented.

A provisioning server 202 is coupled to a network device 104, such as a router, via a physically secure communication link 201. The network device 104 may be one of a plurality of devices undergoing provisioning at a manufacturing facility; in other embodiments, the arrangement of FIG. 2 is used at a customer site. Provisioning server 202 may include or execute on a computing platform comprising conventional hardware such as a processor, memory, input device, display device, and an interface port. An example of such a platform is a conventional laptop computer.

Provisioning server 202 may be implemented as one or more computer programs or other software elements, and may take any of a number of forms. For example, in various embodiments, provisioning server 202 is an application that (1) executes on a computing platform, as discussed above; and (2) resides on a portable computer-readable medium that is communicatively coupled to network device 104.

For example, in one implementation the computer-readable medium is removable flash memory, such as a flash card, which can be inserted into network device 104 for execution of provisioning server 202 using the device's internal operating system and processor. In another implementation, the computer-readable medium is a "smart card," which includes a built-in processor. Thus, execution of provisioning server 202 uses one or more of the network device's operating system, the smart card processor and the device processor. Either implementing device can include provisioning server 202, or can include configuration and identity certification information uploaded from provisioning server 202 for subsequent downloading to network device 104.

Provisioning server 202, in whatever form it may be implemented, comprises means for (1) reading and writing configuration information and parameters to and from network device 104; (2) reading and writing public and/or private key information to and from network device 104; and (3) reading and writing identity certification information to and from network device 104. According to some embodiments, provisioning server 202 further comprises means for communicating with an identity certifying entity, such as a certificate authority and/or a registration authority, over a secure communication link, such as a virtual private network (VPN) tunnel 250. Each such means may comprise one or more computer programs or other software elements that are configured to perform the functions described herein.

In an embodiment, secure communication link 201 comprises a mechanical and electrical coupling between provisioning server 202 and network device 104. For example, link 201 may be an electrical cable, such as a conventional serial cable. One advantage provided by a configuration in which provisioning server 202 is co-located with and directly physically coupled to network device 104 is security. A user, when using a provisioning server 202 to provision a network device 104, knows the identity of the network device and that there are no intervening devices or links between provisioning server 202 and network device 104 that may degrade the security of communications between the configuration server and the device.

Provisioning server 202 comprises a configuration module 204 and an identity certification module 206. Configuration module 204 provides functions for configuring the network device 104 and certification module 206 is configured for certifying the identity of the network device 104. In one embodiment, provisioning server 202 configures the network device for operation at the device's ultimate point of deployment. With device configuration functionality provided by configuration module 204 and device identity certification functionality provided by certification module 206 integrated into a single provisioning server 202, both the configuration and the certification of the device is performed at the same location and as part of the same process.

Using provisioning server 202, a manufacturer of network device 104 is capable of completely configuring the device for operation in a network prior to shipping the device to a customer. Furthermore, provisioning server 202 enables the manufacturer to fulfill customer requests for configuration of the device relative to the device's point of deployment in the customer's network. That is, the customer can provide the manufacturer with information that is necessary to provision the device with the customer-requested functionality, relative to its ultimate point of deployment, and the manufacturer can deliver a device that is ready to fully operate in the customer's network. For example, the customer may provide information such as the IP address, subnet mask, communication protocol, routing table, and the like, for configuration of the network device 104.

Alternatively, for customers that want to configure their network devices themselves, the manufacturer could deliver the device to a customer unconfigured, and the customer could perform the complete configuration and certification of the device as a single secure process, using provisioning server 202.

FIG. 2 further illustrates functional components of identity certification module 206, according to various embodiments. All of the components of certification module 206 need not be present for any one embodiment; rather, different components are applicable to different embodiments. Therefore, FIG. 2 is used to collectively illustrate the components that facilitate various optional features of provisioning server 202.

Figure 1:
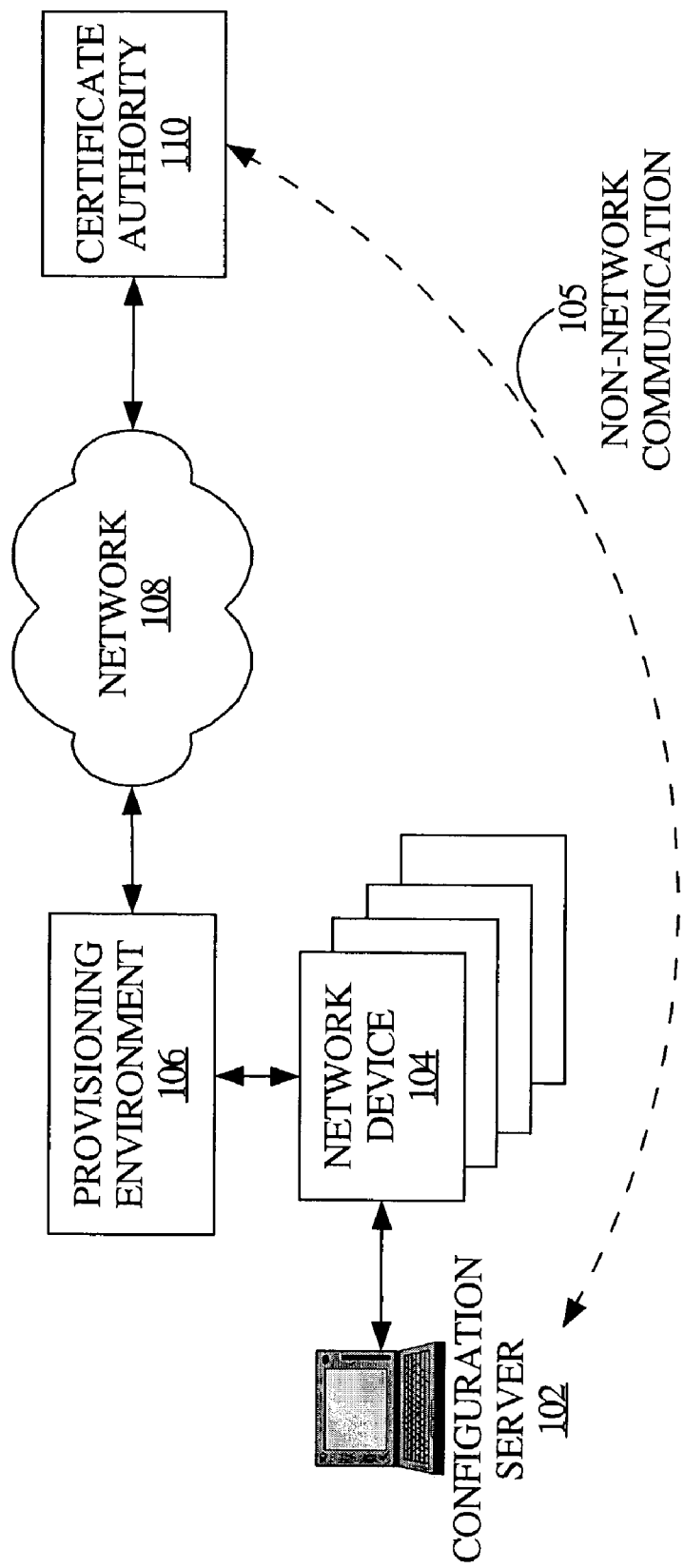
FIG. 1 is a diagram that illustrates an environment for configuring and certifying the identity of a network device is used.

A significant benefit that is obtained by using provisioning server 202 is the capability to certify the identity of a network device 104 without network connectivity. By contrast, prior approaches required network connectivity, such as through provisioning environment 106 (FIG. 1), to communicate with a remote certificate authority 110 as part of a device identity verification and certification process. Communication with a CA over an unsecured public network is not necessary because, according to one embodiment, certification module 206 includes a certificate generator 210 that is configured to generate a digital certificate. Consequently, the certification process is significantly more trusted. Further, the network device 104 is more secure with respect to its identity and associated communications with other network devices in which its identity is relied upon. For example, negotiation of an IPsec connection through creation of a secure association between two or more network devices and exchange of respective keys is a more trusted series of events with a device provisioned through use of provisioning server 202 than with use of prior approaches that are more readily compromised.

In one embodiment, certificate generator 210 comprises an identity registrar, for example, a registration authority, which verifies information associated with a request for a digital certificate. Hence, information provided to the registrar for certifying the identity of device 104 via the provisioning server 202 is not subject to interception, corruption, or external compromise. Increased confidence in the certification of the device is a result of including a registrar as part of provisioning server 202.

According to one embodiment, an identity registrar within provisioning server 202 can use an authority proxy module 212 to communicate securely with a remote certificate authority 110 via a VPN tunnel 250, to obtain a digital certificate on behalf of the network device 104. Hence, the platform on which the provisioning server 202 executes, is configured with a network interface and VPN tunnel endpoint capabilities in order to communicate with an external CA 110 using proxy module 212. This embodiment extends the security of the certification process to the CA because, due to the VPN tunnel 250 or other conventional mechanisms by which a CA or RA can communicate securely, the CA can further trust the provisional server 202 and any information that originates from the provisional server. Such a configuration eliminates the need for out-of-band communication with a CA.

In another embodiment, certificate generator 210 further comprises a certificate authority, which issues the digital certificate associated with network device 104. Hence, information provided to the certificate authority is further secured from undesired interception, corruption, or external compromise. Furthermore, no network connectivity is necessary to certify the identity of network device 104 and no out-ofband communication with a CA 110 is necessary to exchange and/or verify device and CA information.

Another significant benefit that is obtained by using provisioning server 202 to certify the identity of a network device 104 without network connectivity is that the device does not need any interim or temporary configuration that is required to connect to a network in order to communicate with a remote CA or RA. Device 104 is only configured with a final operational configuration relative to its point of deployment. By contrast, in prior approaches, the network device 104 is first configured with network connectivity through the provisioning environment to obtain a digital certificate from a remote CA, and then the temporary configuration is purged from the network device 104 to configure the device for its actual operational point of deployment in a network.

Certificate generator 210 provides to provisioning server 202 the ability to generate a digital certificate, which is associated with a public key that is associated with a network device 104. Furthermore, configuration module 204 provides to provisioning server 202 the ability to configure the device 104 based on the digital certificate. Thus, provisioning server 202 can automatically read the public key from network device 104, generate a digital certificate associated with that public key, and configure the device 104 with the appropriate certificate information. For example, the device is configured with the certified device identity and other parameters associated with the certificate source, from which the trust is rooted.

In one embodiment, provisioning server 202 further comprises a key module 208. Key module 208 is depicted in FIG. 2 as residing in identity certification module 206. However, the location of key module 208 is not important and the key module can be implemented anywhere within provisioning server 202. Key module 208 is configured with one or more algorithms for generating the public key and private key for a network device 104. Therefore, if network device 104 has limited processing capabilities, provisioning server 202 can facilitate the key generation process using a processor external to device 104.

Furthermore, the embodiment that includes key module 208 provides for one-way communication between provisioning server 202 and network device 104, to configure and certify the device. In this embodiment, provisioning server 202 generates the key pair, configuration information, and certification information and then loads it into the network device 104, with the device as a passive "listener" in the process. By contrast, in prior approaches that require two-way communication, the network device 104 is required to have stored its key pair prior to communication with another entity, and the public key is provided to the entity as part of obtaining a digital certificate based on that public key. The one-way communication approach is simpler and more secure than two-way communication approaches.

A provisioning server is therefore described for integrated provisioning of a network device, which configures a network device for operation at the point of deployment and which securely certifies the identity of the network device, both from a single location, without requiring network connectivity and an associated temporary configuration.

2.2 Process for Integrated Provisioning of a Network Device

Figure 3A:
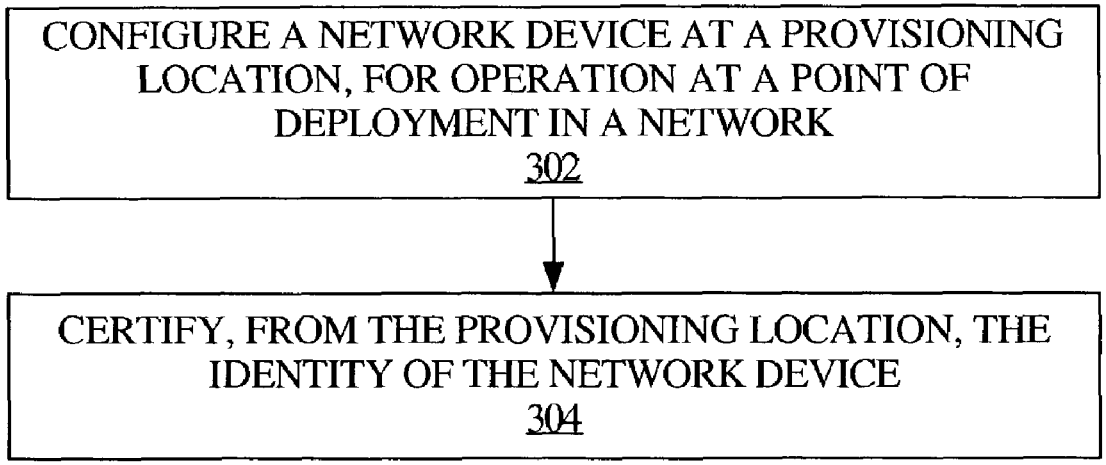
FIG. 3A is a flow diagram that illustrates a process for integrated provisioning of a network device.

FIG. 3A is a flow diagram that illustrates a process for integrated provisioning of a network device. According to one aspect, the process illustrated in FIG. 3A is performed using a provisioning server 202 as described above.

At block 302, a network device is configured, at a provisioning location, for operation at a point of deployment in a network. At block 304, the identity of the network device is certified, from the same provisioning location. Using an integrated provisioning server, such as provisioning server 202 (FIG. 2), both customized configuration of a device and certification of its identity can be performed at a single location, without network connectivity.

The process is simpler and less error prone than prior approaches and results in a more secure network device than with prior approaches. For example, use of a certificate enrollment protocol, out-of-band communications with a remote certificate authority, and multiple device configurations are not necessary. All of the steps can be performed from a single console co-located with and coupled to the network device via a serial port and cable. After configuring a device to operate in a network, the next logical step from a security standpoint is to certify the identity of the device so that it can operate in a network securely. Provisioning server 202 (FIG. 2) facilitates such a process.

Figure 3B:
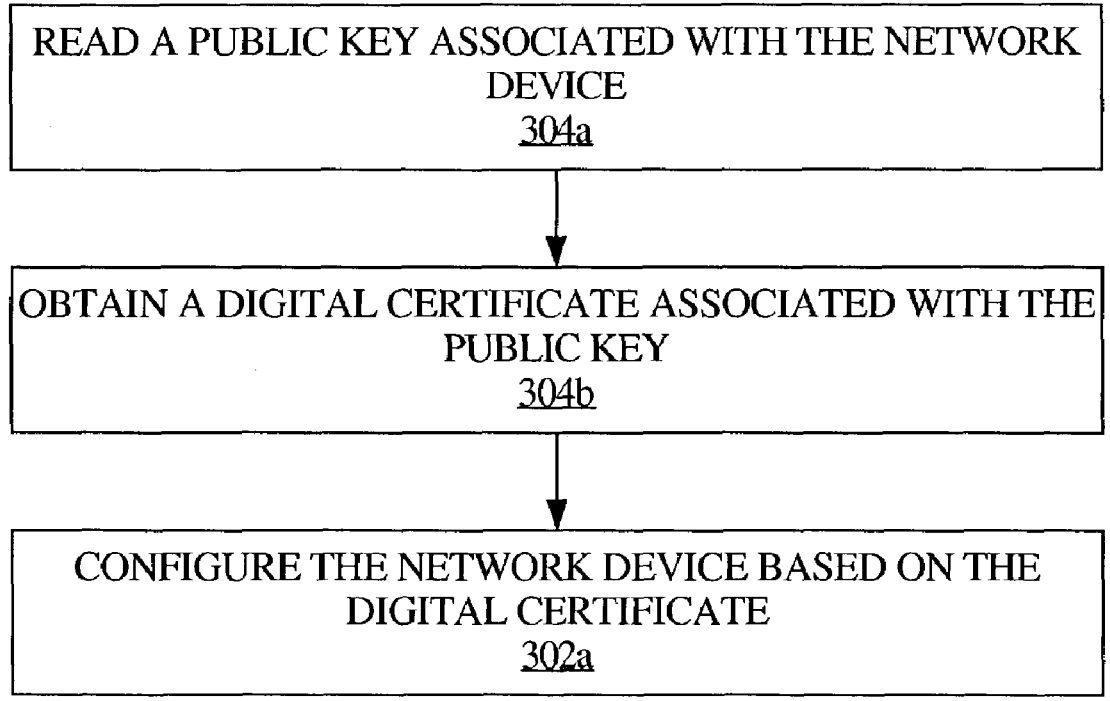
FIG. 3B is a flow diagram that illustrates details of the process of FIG. 3A.

FIG. 3B is a flow diagram that illustrates details of the process of FIG. 3A, according to an embodiment. At block 304a, a public key associated with the network device undergoing provisioning is read. In one scenario (i.e., with one-way communication), the public key is read from memory allocated to provisioning server 202 (FIG. 2). In another scenario (i.e., with two-way communication), the public key is read from the device. At block 304b, a digital certificate associated with the public key is obtained. In one scenario, the digital certificate is obtained from a local certificate authority that is part of provisioning server 202. In another scenario, the digital certificate is obtained from a remote certificate authority over a secure link, such as VPN tunnel 250 (FIG. 2). Blocks 304a and 304b complete the identity certification process of block 304.

Next, at block 302a, the network device is configured, or further configured if part of the configuration process is already completed, based on the digital certificate. The digital certificate is added to the device's configuration. Blocks 304a, 304b, 302a are automated steps performed by provisioning server 202. The server performs these steps by automatically exchanging information among the device and functional components of the server and by automatically generating and submitting appropriate configuration information to the network device. In one embodiment, configuration information is submitted to the network device using CLI (command line interface) commands. The device is now configured and certified and ready for deployment in a network.

3.0 IMPLEMENTATION MECHANISMS

Hardware Overview

Figure 4:
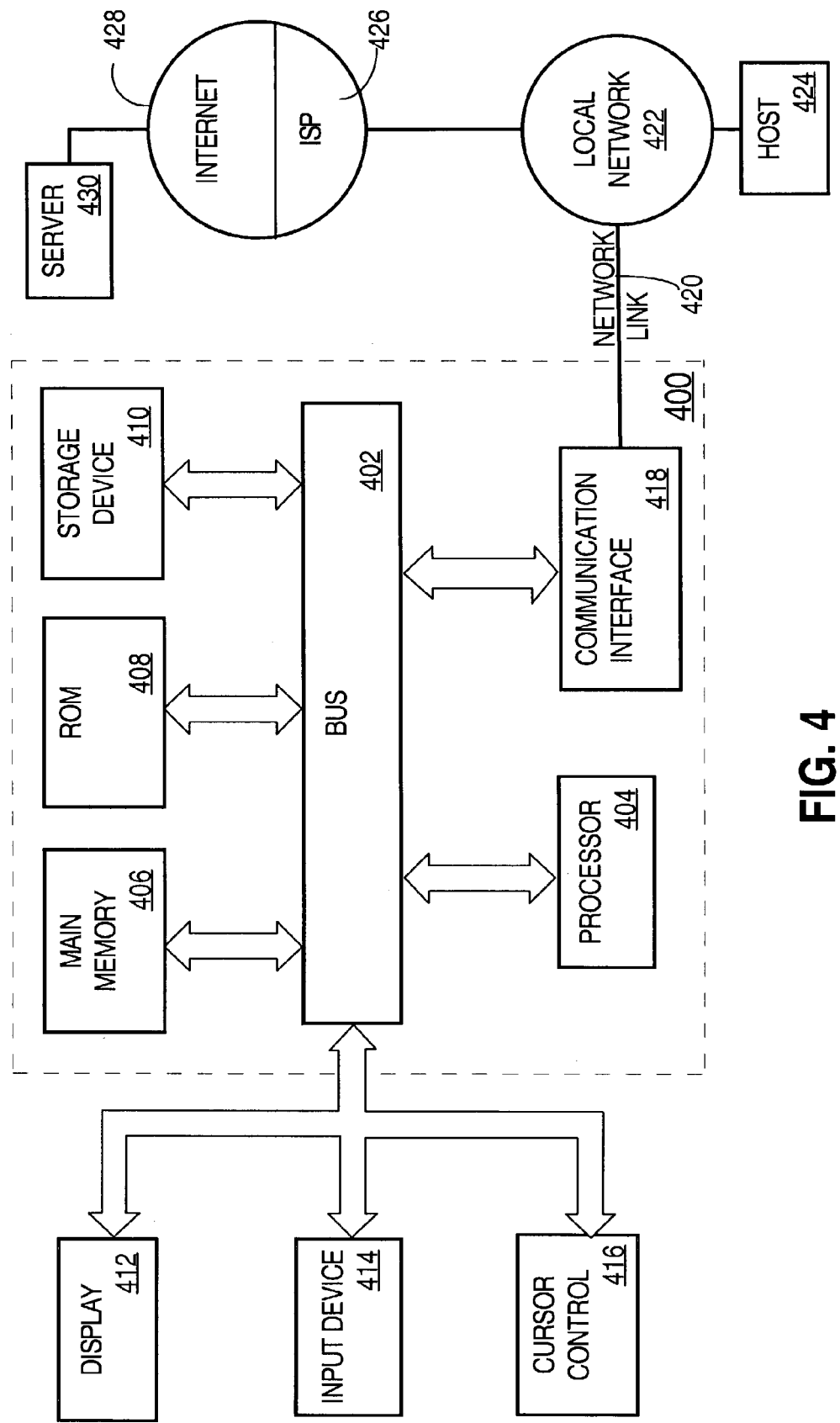
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, may be coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for integrated provisioning of a network device with configuration information and identity certification. According to one embodiment of the invention, integrated provisioning of a network device with configuration information and identity certification is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for integrated provisioning of a network device with configuration information and identity certification as described herein.

The received code may be executed by processor 404 as it is received, and/or stored in storage device 410, or other non-volatile storage for later execution. In this manner, computer system 400 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. For example, use of a certificate authority and registration authority are not limited to any particular version or implementation of such authorities or to any specific public key infrastructure. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A provisioning server for integrated provisioning of a network device with configuration information and identity certification, comprising:
   a configuration module that is adapted for configuring the network device; and
   an identification certification module that is configured for certifying the identity of the network device;
   wherein the network device comprises one or more of routers, or packet data switches, that function in a packet switched communication network and wherein the provisioning server is physically co-located with and coupled to the network device via a physically secure communication link and wherein the provisioning server is configured to read and write configuration information and parameters, key information and identity certification information to and from the network device over the link;
   wherein the provisioning server is configured to read and write the configuration information, key information and identity certification information over the link without network connectivity to the network device over the link;
   wherein the identification certification module is configured for obtaining certification of the network device's identity without a network connection between the network device and an external certificate authority; and
   wherein the identification module is configured to:
      generate a public key and a private key that are associated with the network device.

2. The server of claim 1, wherein physically secure communication link is a serial cable.

3. The server of claim 1, wherein a computer on which the server executes is mechanically and electrically coupled to the network device with an electrical cable.

4. The server of claim 1, wherein the server resides on a portable computer-readable medium that is mechanically and electrically coupled to the network device.

5. The server of claim 4, wherein the computer-readable medium comprises a removable flash memory.

6. The server of claim 4, wherein the computer-readable medium comprises a smart card.

7. The server of claim 1, wherein the configuration module is configured to configure the network device for operation at the device's point of deployment in a network.

8. The server of claim 1, wherein the identification certification module is configured to:
   generate a digital certificate that is associated with a public key that is associated with the network device; and
   wherein the configuration module is configured to:
      configure the network device based on the digital certificate.

9. The server of claim 8, wherein the identification module is configured to:
   read, from the network device, the public key that is associated with the network device.

10. The server of claim 1, wherein the identification certification module comprises an identity registrar for verifying information associated with a request for a digital certificate.

11. The server of claim 10, wherein the identity registrar is a PKI registration authority.

12. The server of claim 1, wherein the identification certification module comprises an identity registrar for verifying information associated with a request for a digital certificate and a certificate authority for issuing a digital certificate.

13. A method for integrated provisioning of a network device, the method comprising the computer-implemented steps of:
   in a provisioning server, configuring the network device at a provisioning location, for operation at a deployment location in a network; and
   in the provisioning server, certifying, from the provisioning location and without network connectivity, the identity of the network device;
   wherein the network device comprises one or more of routers, or packet data switches, that function in a packet switched communication network and wherein the provisioning server is physically co-located with and coupled to the network device via a physically secure communication link and wherein the provisioning server is configured to read and write configuration information and parameters, key information and identity certification information to and from the network device over the link;
   wherein the provisioning server is configured to read and write the configuration information, key information and identity certification information over the link without network connectivity to the network device over the link;
   wherein the identification certification module is configured for obtaining certification of the network device's identity without a network connection between the network device and an external certificate authority; and
   wherein the identification module is configured to:
      generate a public key and a private key that are associated with the network device.

14. The method of claim 13, wherein the step of certifying comprises the steps of:
   reading a public key associated with the network device;
   obtaining a digital certificate associated with the public key; and
   wherein the step of configuring includes configuring the network device based on the digital certificate.

15. The method of claim 14, wherein the step of obtaining a digital certificate includes generating the digital certificate.

16. The method of claim 14, wherein the step of obtaining a digital certificate includes the steps of:
   verifying the identity of the network device based on information provided regarding the network device; and
   generating the digital certificate associated with the network device in response to verifying the identity of the network device.

17. A computer-readable medium carrying one or more sequences of instructions for provisioning of a network device, which instructions, when executed by one or more processors, cause the one or more processors to carry out the steps of:

configuring the network device at a provisioning location, for operation at a deployment location in a network; and certifying, from the provisioning location and without network connectivity, the identity of the network device;

wherein the network device comprises one or more of routers, or packet data switches, that function in a packet switched communication network and wherein the instructions are physically co-located with and communicate with the network device via a physically secure communication link and wherein the instructions are configured to read and write configuration information and parameters, key information and identity certification information to and from the network device over the link;

wherein the instructions are configured to read and write the configuration information, key information and identity certification information over the link without network connectivity to the network device over the link;

wherein the identification certification module is configured for obtaining certification of the network device's identity without a network connection between the network device and an external certificate authority; and wherein a identification module is configured to:
  generate a public key and a private key that are associated with the network device.

18. The computer-readable medium of claim 17, wherein the one or more sequences of instructions cause the one or more processors to carry out the step of certifying by
  reading a public key associated with the network device;
  obtaining a digital certificate associated with the public key; and
  cause the one or more processors to carry out the step of certifying by
  configuring the network device based on the digital certificate.

19. The computer-readable medium of claim 18, wherein the one or more sequences of instructions cause the one or more processors to carry out the step of obtaining a digital certificate by generating the digital certificate.

20. The computer-readable medium of claim 18, wherein the one or more sequences of instructions cause the one or more processors to carry out the step of obtaining a digital certificate by carrying out the steps of:
  verifying the identity of the network device based on information provided regarding the network device; and
  generating the digital certificate associated with the network device in response to verifying the identity of the network device.

21. A system for integrated provisioning of a network device, the system comprising:
  means for configuring the network device at a provisioning location, for operation at a deployment location in a network; and
  means for certifying, from the provisioning location and without network connectivity, the identity of the network device;

wherein the network device comprises one or more of routers, or packet data switches, that function in a packet switched communication network and wherein the system is physically co-located with and coupled to the network device via a physically secure communication link and wherein the system is configured to read and write configuration information and parameters, key information and identity certification information to and from the network device over the link;

wherein the system is configured to read and write the configuration information, key information and identity certification information over the link without network connectivity to the network device over the link;

wherein the identification certification module is configured for obtaining certification of the network device's identity without a network connection between the network device and an external certificate authority; and wherein the identification module is configured to:
  generate the public key and a private key that are associated with the network device.

22. A device that can provision a network device, the device comprising:
  a processor;
  a computer-readable medium comprising one or more stored sequences which, when executed by the processor, cause the processor to carry out the steps of:
    configuring the network device at a provisioning location, for operation at a deployment location in a network; and
    certifying, from the provisioning location and without network connectivity, the identity of the network device;

wherein the network device comprises one or more of routers, or packet data switches, that function in a packet switched communication network and wherein the device is physically co-located with and coupled to the network device via a physically secure communication link and wherein the device is configured to read and write configuration information and parameters, key information and identity certification information to and from the network device over the link;

wherein the device is configured to read and write the configuration information, key information and identity certification information over the link without network connectivity to the network device over the link;

wherein the identification certification module is configured for obtaining certification of the network device's identity without a network connection between the network device and an external certificate authority; and wherein the identification module is configured to:
  generate the public key and a private key that are associated with the network device.

* * * * *